US012352488B2

(12) United States Patent
Liu et al.

(10) Patent No.: US 12,352,488 B2
(45) Date of Patent: Jul. 8, 2025

(54) SUB-KELVIN TEMPERATURE ZONE REFRIGERATION MECHANISM

(71) Applicant: Shanghai Institute of Technical Physics Chinese Academy of Sciences, Shanghai (CN)

(72) Inventors: Shaoshuai Liu, Shanghai (CN); Yinong Wu, Shanghai (CN); Xiaoshan Pan, Shanghai (CN); Zhenhua Jiang, Shanghai (CN); Lei Ding, Shanghai (CN); Xinquan Sha, Shanghai (CN); Jiantang Song, Shanghai (CN); Zhichao Chen, Shanghai (CN); Baoyu Yang, Shanghai (CN); Zhi Lu, Shanghai (CN); Zheng Huang, Shanghai (CN)

(73) Assignee: Shanghai Institute of Technical Physics Chinese Academy of Sciences, Shanghai (JP)

( * ) Notice: Subject to any disclaimer, the term of this patent is extended or adjusted under 35 U.S.C. 154(b) by 324 days.

(21) Appl. No.: 18/069,807

(22) Filed: Dec. 21, 2022

(65) Prior Publication Data

US 2024/0102701 A1  Mar. 28, 2024

(30) Foreign Application Priority Data

Sep. 26, 2022 (CN) .......................... 202211169079.1

(51) Int. Cl.
*F25B 9/14* (2006.01)
*F25B 9/10* (2006.01)
(Continued)

(52) U.S. Cl.
CPC ................ *F25B 9/145* (2013.01); *F25B 9/10* (2013.01); *F25B 15/008* (2013.01); *F25B 41/20* (2021.01); *F25B 2309/1412* (2013.01)

(58) Field of Classification Search
CPC .... F25B 9/10; F25B 9/12; F25B 9/145; F25B 15/008; F25B 37/00; F25B 41/20; F25B 41/31; F25B 2309/1412; F25B 2309/1415
See application file for complete search history.

(56) References Cited

U.S. PATENT DOCUMENTS 9,134,047 B2 *  9/2015  Black ................. H05K 7/20372

FOREIGN PATENT DOCUMENTS

JP    2003194428 A  *  7/2003
JP    2009074774 A  *  4/2009

OTHER PUBLICATIONS

JP2009074774A_Description_Translated (Year: 2009).*
(Continued)

*Primary Examiner* — Jerry-Daryl Fletcher
*Assistant Examiner* — Keona Lauren Banks
(74) *Attorney, Agent, or Firm* — Techlaw Ventures, PLLC; Bretton L. Crockett

(57) ABSTRACT

Disclosed is a sub-Kelvin temperature zone refrigeration mechanism. The sub-Kelvin temperature zone refrigeration mechanism includes a pulse tube refrigeration unit, first pre-cooling heat exchangers, a throttling refrigeration unit, second pre-cooling heat exchangers, an adsorption refrigeration unit, a third pre-cooling heat exchanger and a dilution refrigeration unit. The pulse tube refrigeration unit includes a pulse tube refrigeration part. The throttling refrigeration unit includes a throttling refrigeration part, and the throttling refrigeration part is connected with the adsorption refrigeration unit through the second pre-cooling heat exchangers so as to pre-cool the adsorption refrigeration unit. The adsorption refrigeration unit includes an adsorption refrigeration part, and the adsorption refrigeration part is connected with the dilution refrigeration unit through the third pre-cooling heat exchanger. The dilution refrigeration
(Continued)

unit includes a dilution refrigeration part, and the dilution refrigeration part is a refrigeration terminal of the sub-Kelvin temperature zone refrigeration mechanism.

8 Claims, 1 Drawing Sheet

(51) Int. Cl.
    *F25B 15/00*     (2006.01)
    *F25B 41/20*     (2021.01)

(56) References Cited

OTHER PUBLICATIONS

JP2003194428A_Description_Translated (Year: 2003).*
Chao, Yijun, et al.. A two-stage thermally-coupled pulse tube cryocooler working at 35 K for space application.[online] Feb. 2022 [retrieved on Dec. 13, 2024]. Retrieved from the Internet:<https://doi.org/10.1016/j.actaastro.2021.11.007> (Year: 2022).*

* cited by examiner

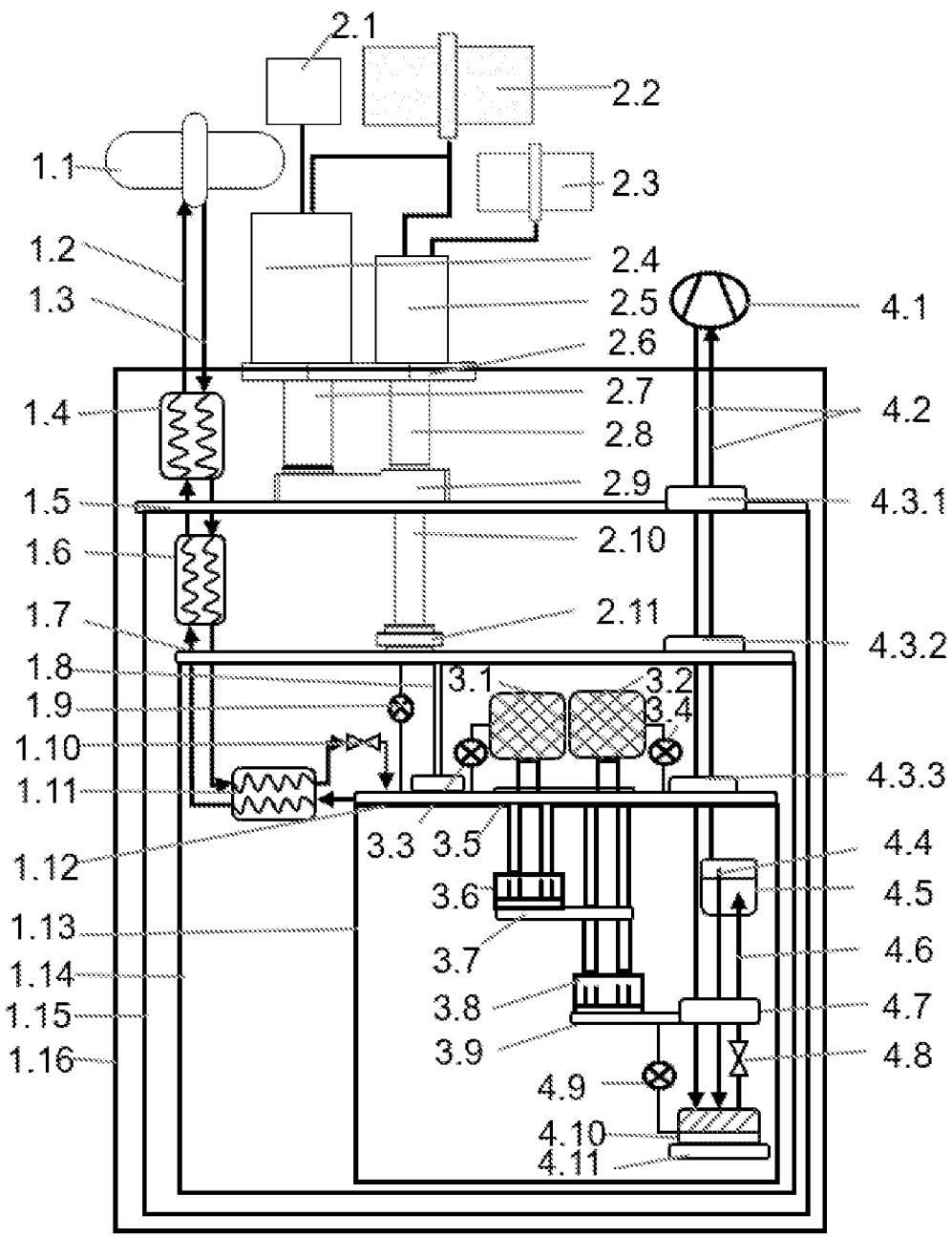

SUB-KELVIN TEMPERATURE ZONE REFRIGERATION MECHANISM

CROSS-REFERENCE TO RELATED APPLICATION

This patent application claims the benefit and priority of Chinese Patent Application No. 202211169079.1 filed with the China National Intellectual Property Administration on Sep. 26, 2022, the disclosure of which is incorporated by reference herein in its entirety as part of the present application.

TECHNICAL FIELD

The present disclosure relates to the technical field of refrigeration equipment, in particular to a sub-Kelvin temperature zone refrigeration mechanism.

BACKGROUND

In order to reduce background noise and improve the signal-to-noise ratio, the sensitivity and the resolution of optical detectors such as a superconducting quantum interference device (SQUID), a superconducting nanowire single photon detector (SNSPD), a superconducting terahertz detector and a millimeter and submillimeter wave detector, the optical detectors, as well as optical equipment and electronic equipment attached to the optical detectors usually need to work in a sub-Kelvin profound hypothermia environment. At present, a single one adiabatic demagnetizing refrigerator, or both an adiabatic demagnetizing refrigerator and a dilution refrigerator are usually used to form the sub-Kelvin profound hypothermia environment.

SUMMARY

The present disclosure aims to provide a sub-Kelvin temperature zone refrigeration mechanism. A throttling refrigeration unit, a pulse tube refrigeration unit, an adsorption refrigeration unit and a dilution refrigeration unit are combined in the refrigeration mechanism, so that the refrigeration effect of the refrigeration mechanism is improved in a multi-stage pre-cooling mode.

In order to achieve the-mentioned purpose, some embodiments provide the following solutions.

Disclosed is a sub-Kelvin temperature zone refrigeration mechanism, including a pulse tube refrigeration unit, first pre-cooling heat exchangers, a throttling refrigeration unit, second pre-cooling heat exchangers, an adsorption refrigeration unit, a third pre-cooling heat exchanger and a dilution refrigeration unit, where the pulse tube refrigeration unit includes a pulse tube refrigeration heat exchanger, and the pulse tube refrigeration heat exchanger is connected with the throttling refrigeration unit through the first pre-cooling heat exchangers so as to pre-cool the throttling refrigeration unit, the throttling refrigeration unit includes a throttling refrigeration heat exchanger, and the throttling refrigeration heat exchanger is connected with the adsorption refrigeration unit through the second pre-cooling heat exchangers so as to pre-cool the adsorption refrigeration unit, the adsorption refrigeration unit includes an adsorption refrigeration heat exchanger, and the adsorption refrigeration heat exchanger is connected with the dilution refrigeration unit through the third pre-cooling heat exchanger so as to pre-cool the dilution refrigeration unit; and the dilution refrigeration unit includes a dilution refrigeration heat exchanger, and the dilution refrigeration heat exchanger is a refrigeration terminal of the sub-Kelvin temperature zone refrigeration mechanism.

Preferably, the throttling refrigeration unit includes a throttling compressor, a throttling valve and the throttling refrigeration heat exchanger, an output end of the throttling compressor is connected with an input end of the throttling valve, an output end of the throttling valve is connected with an input end of the throttling refrigeration heat exchanger, and an output end of the throttling refrigeration heat exchanger is connected with an input end of the throttling compressor; and the first pre-cooling heat exchangers are located between the throttling compressor and the throttling valve and configured for cooling gas output by the throttling compressor.

Preferably, the throttling refrigeration unit further includes counter-flow heat exchangers, and the counter-flow heat exchangers are located between the throttling compressor and the throttling valve and configured for cooling gas output by the throttling compressor.

Preferably, the pulse tube refrigeration unit is a two-stage pulse tube refrigeration unit and includes a primary pulse tube phase modulation component, a pulse tube main drive compressor, a secondary pulse tube phase modulation component, a primary pulse tube hot end, a secondary pulse tube hot end, a primary pulse tube heat regenerator, a secondary pulse tube high-temperature section heat regenerator, a pulse tube intermediate heat exchanger, a secondary pulse tube low-temperature section heat regenerator and the pulse tube refrigeration heat exchanger; an output end of the pulse tube main drive compressor is connected with each of the primary pulse tube hot end and the secondary pulse tube hot end; the primary pulse tube phase modulation component, the primary pulse tube hot end, the primary pulse tube heat regenerator and the pulse tube intermediate heat exchanger are sequentially connected; the secondary pulse tube phase modulation component, the secondary pulse tube hot end, the secondary pulse tube high-temperature section heat regenerator, the pulse tube intermediate heat exchanger, the secondary pulse tube low-temperature section heat regenerator and the pulse tube refrigeration heat exchanger are sequentially connected; the first pre-cooling heat exchangers include a primary first pre-cooling heat exchanger and a secondary first pre-cooling heat exchanger, the primary first pre-cooling heat exchanger is connected with the pulse tube intermediate heat exchanger, and the secondary first pre-cooling heat exchanger is connected with the pulse tube refrigeration heat exchanger.

Preferably, the adsorption refrigeration unit is a two-stage adsorption refrigeration unit and includes a primary adsorption pump, a secondary adsorption pump, a primary evaporator, a secondary evaporator and the adsorption refrigeration heat exchanger; the second pre-cooling heat exchangers include a primary second pre-cooling heat exchanger and a secondary second pre-cooling heat exchanger; the primary adsorption pump is connected with the primary evaporator through a primary pipeline; the secondary adsorption pump is connected with the secondary evaporator through a secondary pipeline; the primary second pre-cooling heat exchanger is in contact with each of the primary pipeline, the secondary pipeline and the throttling refrigeration heat exchanger for heat exchange, the secondary second pre-cooling heat exchanger is in contact with each of the primary evaporator and the secondary pipeline for heat exchange, and the adsorption refrigeration heat exchanger is in contact with the secondary evaporator.

Preferably, the dilution refrigeration unit includes a suction pump, a mixing chamber, a distiller and the dilution refrigeration heat exchanger; an input end of the suction pump is connected with a first output end of the distiller through a $^3$He circulating pipeline, an output end of the suction pump is connected with a first input end of the mixing chamber through the $^3$He circulating pipeline, and an output end of the mixing chamber is connected with an input end of the distiller through a $^3$He-$^4$He mixed fluid circulating capillary tube; a second output end of the distiller is connected with a second input end of the mixing chamber through a $^4$He circulating pipeline; the dilution refrigeration heat exchanger is connected with the mixing chamber; the third pre-cooling heat exchanger is in contact with each of the $^3$He-$^4$He mixed fluid circulating capillary tube, the $^4$He circulating pipeline and the $^3$He circulating pipeline, and the adsorption refrigeration heat exchanger is in contact with the third pre-cooling heat exchanger.

Preferably, the dilution refrigeration unit further includes a first intermediate heat exchanger, a second intermediate heat exchanger and a third intermediate heat exchanger, and the $^3$He circulating pipeline passes through the first intermediate heat exchanger, the second intermediate heat exchanger and the third intermediate heat exchanger; the first pre-cooling heat exchangers include a primary first pre-cooling heat exchanger and a secondary first pre-cooling heat exchanger; the first intermediate heat exchanger is in contact with the primary first pre-cooling heat exchanger; the second intermediate heat exchanger is in contact with the secondary first pre-cooling heat exchanger; and the third intermediate heat exchanger is in contact with the throttling refrigeration heat exchanger.

Preferably, the sub-Kelvin temperature zone refrigeration mechanism further including a first cold screen, a second cold screen, a third cold screen and a shell, where the first pre-cooling heat exchangers include a primary first pre-cooling heat exchanger and a secondary first pre-cooling heat exchanger; the first cold screen and the throttling refrigeration heat exchanger are enclosed into a first closed space, the second cold screen and the secondary first pre-cooling heat exchanger are enclosed into a second closed space, the third cold screen and the primary first pre-cooling heat exchanger are enclosed into a third closed space, and the shell is enclosed into a fourth closed space; the first closed space, the second closed space, the third closed space and the fourth closed space are sequentially nested from inside to outside; the dilution refrigeration heat exchanger and the adsorption refrigeration heat exchanger are located inside the first closed space; and the pulse tube refrigeration heat exchanger is located inside the third closed space and located outside the second closed space.

Preferably, the throttling refrigeration heat exchanger is connected with one of the first pre-cooling heat exchangers through a first heat switch.

Compared with the prior art, some embodiments have the following technical effects.

According to the sub-Kelvin temperature zone refrigeration mechanism, a multi-stage pre-cooling mode is adopted. Compared with the mode that a single refrigeration unit is used for direct refrigeration, lower refrigeration temperature and larger cooling capacity can be obtained. In addition, the tail end of the sub-Kelvin temperature zone refrigeration mechanism is a dilution refrigeration unit, and the refrigeration mode of the dilution refrigeration unit is a continuous refrigeration mode, so that the temperature of the dilution refrigeration heat exchanger can be kept below 300 mK and even below 50 mK for a longer time. A sub-Kelvin profound hypothermia environment required by the work of various devices (such as an aviation detector, as well as optical devices and electronic devices attached to the aviation detector) is provided.

BRIEF DESCRIPTION OF THE DRAWINGS

To more clearly illustrate the technical solutions in the embodiments of the present disclosure or the prior art, the following briefly introduces the drawings to be used in the embodiment. Apparently, the drawings in the following description show merely some embodiments of the present disclosure, and those skilled in the art may still obtain other drawings from these drawings without creative efforts.

FIG. 1 is a schematic diagram of a sub-Kelvin temperature zone refrigeration mechanism according to an embodiment of the present disclosure.

Reference signs in the drawings: 1.1 throttling compressor; 1.2 low-pressure pipeline; 1.3 high-pressure pipeline. 1.4 primary counter-flow heat exchanger; 1.5 primary first pre-cooling heat exchanger; 1.6 secondary counter-flow heat exchanger; 1.7 secondary first pre-cooling heat exchanger; 1.8 supporting structure; 1.9 first heat switch; 1.10 throttling valve; 1.11 third-stage counter-flow heat exchanger; 1.12 throttling refrigeration heat exchanger; 1.13 first cold screen; 1.14 second cold screen; 1.15 third cold screen; 1.16 shell; 2.1 primary pulse tube phase modulation component; 2.2 pulse tube main drive compressor; 2.3 secondary pulse tube phase modulation component; 2.4 primary pulse tube hot end; 2.5 secondary pulse tube hot end; 2.6 sealing flange plate; 2.7 primary pulse tube heat regenerator; 2.8 secondary pulse tube high-temperature section heat regenerator; 2.9 pulse tube intermediate heat exchanger; 2.10 secondary pulse tube low-temperature section heat regenerator; 2.11 pulse tube refrigeration heat exchanger; 3.1 primary adsorption pump; 3.2 secondary adsorption pump; 3.3 second heat switch; 3.4 third heat exchanger; 3.5 primary second pre-cooling heat exchanger; 3.6 primary evaporator; 3.7 secondary second pre-cooling heat exchanger; 3.8 secondary evaporator; 3.9 adsorption refrigeration heat exchanger; 4.1 suction pump; 4.2 $^3$He circulating pipeline; 4.3.1 first intermediate heat exchanger; 4.3.2 second intermediate heat exchanger; 4.3.3 third intermediate heat exchanger; 4.4 $^4$He circulating pipeline; 4.5 distiller; 4.6 $^3$He-$^4$He mixed fluid circulating capillary tube; 4.7 third pre-cooling heat exchanger; 4.8 mixed fluid stop valve; 4.9 fourth heat switch; 4.10 mixing chamber; and 4.11 dilution refrigeration heat exchanger.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are merely a part rather than all of the embodiments of the present disclosure. Based on the embodiment in the present disclosure, all other embodiments obtained by the skilled person in the art under the premise of without contributing creative labor belong to the scope protected by the present disclosure.

The present disclosure aims to provide a sub-Kelvin temperature zone refrigeration mechanism. A throttling refrigeration unit, a pulse tube refrigeration unit, an adsorption refrigeration unit and a dilution refrigeration unit are combined in the refrigeration mechanism, and the refrigeration effect thereof is improved in a multi-stage pre-cooling mode.

To make the foregoing objective, features and advantages of the present disclosure clearer and more comprehensible, the present disclosure is further described in detail below with reference to the drawings and specific embodiments. The sub-Kelvin temperature zone in the embodiment refers to a temperature zone with a temperature range of 5 mK to 300 mK.

Referring to FIG. 1, the embodiment provides a sub-Kelvin temperature zone refrigeration mechanism. The sub-Kelvin temperature zone refrigeration mechanism includes a pulse tube refrigeration unit, first pre-cooling heat exchangers, a throttling refrigeration unit, second pre-cooling heat exchangers, an adsorption refrigeration unit, a third pre-cooling heat exchanger 4.7 and a dilution refrigeration unit. The pulse tube refrigeration unit includes a pulse tube refrigeration heat exchanger 2.11, and the pulse tube refrigeration heat exchanger 2.11 is connected with the throttling refrigeration unit through the first pre-cooling heat exchangers so as to pre-cool the throttling refrigeration unit. The throttling refrigeration unit includes a throttling refrigeration heat exchanger 1.12, and the throttling refrigeration heat exchanger 1.12 is connected with the adsorption refrigeration unit through the second pre-cooling heat exchangers so as to pre-cool the adsorption refrigeration unit. The adsorption refrigeration unit includes an adsorption refrigeration heat exchanger 3.9, and the adsorption refrigeration heat exchanger 3.9 is connected with the dilution refrigeration unit through the third pre-cooling heat exchanger 4.7 so as to pre-cool the dilution refrigeration unit. The dilution refrigeration unit includes a dilution refrigeration heat exchanger 4.11, and the dilution refrigeration heat exchanger 4.11 is a refrigeration terminal of the sub-Kelvin temperature zone refrigeration mechanism.

The working process of the sub-Kelvin temperature zone refrigeration mechanism is as follows. The pulse tube refrigeration unit firstly works, so that the pulse tube refrigeration heat exchanger 2.11 reaches a first predetermined temperature range (such as 15 K to 90 K) to pre-cool the throttling refrigeration unit. Then, the throttling refrigeration unit works, so that the throttling refrigeration section 1.12 reaches a second predetermined temperature range (such as 1.5 K to 6 K) to pre-cool the adsorption refrigeration unit. Then, the adsorption refrigeration unit works so that the adsorption refrigeration heat exchanger 3.9 reaches a third predetermined temperature range (such as 300 mK to 1 K) to pre-cool the dilution refrigeration unit. Finally, the dilution refrigeration unit works, the dilution refrigeration heat exchanger 4.11 serves as a refrigeration terminal, and the temperature of the dilution refrigeration heat exchanger 4.11 is the lowest refrigeration temperature of the sub-Kelvin temperature zone refrigeration mechanism. According to the sub-Kelvin temperature zone refrigeration mechanism, a multi-stage pre-cooling mode is adopted. Compared with the mode that a single refrigeration unit is used for direct refrigeration, lower refrigeration temperature and larger cooling capacity can be obtained. In addition, the tail end of the sub-Kelvin temperature zone refrigeration mechanism is a dilution refrigeration unit, and the refrigeration mode of the dilution refrigeration unit is a continuous refrigeration mode, so that the temperature of the dilution refrigeration heat exchanger 4.11 can be kept below 300 mK and even below 50 mK for a longer time. A sub-Kelvin profound hypothermia environment required by the work of various devices (such as an aviation detector, as well as optical devices and electronic devices attached to the aviation detector) is provided.

Referring to FIG. 1, as a possible example, the throttling refrigeration unit includes a throttling compressor 1.1, a throttling valve 1.10 and the throttling refrigeration heat exchanger 1.12. The output end of the throttling compressor 1.1 is connected with the input end of the throttling valve 1.10, the output end of the throttling valve 1.10 is connected with the input end of the throttling refrigeration heat exchanger 1.12, and the output end of the throttling refrigeration heat exchanger 1.12 is connected with the input end of the throttling compressor 1.1. The first pre-cooling heat exchangers are located between the throttling compressor 1.1 and the throttling valve 1.10 and used for cooling gas, such as helium, output by the throttling compressor 1.1.

After the helium is compressed by the throttling compressor 1.1, the compressed helium enters the throttling valve 1.10 for throttling refrigeration, and obtains a corresponding refrigeration temperature and refrigeration capacity at the throttling refrigeration heat exchanger 1.12. Before the compressed helium enters the throttling valve 1.10, the first pre-cooling heat exchangers are used as intermediate structures at the first pre-cooling heat exchangers, so that the pulse tube refrigeration heat exchanger 2.11 pre-cools the compressed helium.

Before the compressed helium enters the throttling valve 1.10, in order to further cool the compressed helium, in the embodiment, the throttling refrigeration unit further includes counter-flow heat exchangers, and the counter-flow heat exchangers are located between the throttling compressor 1.1 and the throttling valve 1.10 and used for cooling the gas output by the throttling compressor 1.1. The number and the connecting sequence of the first pre-cooling heat exchangers and the counter-flow heat exchangers can be selected by those skilled in the art as required. For example, referring to FIG. 1, three counter-flow heat exchangers and two first pre-cooling heat exchangers are connected in series. The three counter-flow heat exchangers include a primary counter-flow heat exchanger 1.4, a secondary counter-flow heat exchanger 1.6 and a third-stage counter-flow heat exchanger 1.11. The two first pre-cooling heat exchangers include a primary first pre-cooling heat exchanger 1.5 and a secondary first pre-cooling heat exchanger 1.7. The primary first pre-cooling heat exchanger 1.5 is arranged between the primary counter-flow heat exchanger 1.4 and the secondary counter-flow heat exchanger 1.6, and the secondary first pre-cooling heat exchanger 1.7 is arranged between the secondary counter-flow heat exchanger 1.6 and the third-stage counter-flow heat exchanger 1.11. It can be understood that the pipeline connected to the output end of the throttling compressor 1.1 is a high-pressure pipeline 1.3, another pipeline connected to the input end of the throttling compressor 1.1 is a low-pressure pipeline 1.2, and the pressure of the helium in the high-pressure pipeline 1.3 is larger than that in the low-pressure pipeline 1.2.

Referring to FIG. 1, as a possible example of the embodiment, the pulse tube refrigeration unit is a two-stage pulse tube refrigeration unit, and the refrigeration principle of the pulse tube refrigeration unit is that of a coaxial type pulse tube refrigerator. The pulse tube refrigeration unit includes a primary pulse tube phase modulation component 2.1, a pulse tube main drive compressor 2.2, a secondary pulse tube phase modulation component 2.3, a primary pulse tube hot end 2.4, a secondary pulse tube hot end 2.5, a primary pulse tube heat regenerator 2.7, a secondary pulse tube high-temperature section heat regenerator 1.8, a pulse tube intermediate heat exchanger 2.9, a secondary pulse tube low-temperature section heat regenerator 2.10 and the pulse tube refrigeration heat exchanger 2.11. The primary pulse tube phase modulation component 2.1 and the secondary pulse tube phase modulation component 2.3 each may be phase modulation compressors for achieving active phase modulation of the pulse tube refrigeration unit. The output end of the pulse tube main drive compressor 2.2 is connected with both the primary pulse tube hot end 2.4 and the secondary pulse tube hot end 2.5, so that a refrigerant is driven to flow through the pulse tube main drive compressor 2.2. The primary pulse tube phase modulation component 2.1, the primary pulse tube hot end 2.4, the primary pulse tube heat regenerator 2.7 and the pulse tube intermediate heat exchanger 2.9 are sequentially connected. The secondary pulse tube phase modulation component 2.3, the secondary pulse tube hot end 2.5, the secondary pulse tube high-temperature section heat regenerator 2.8, the pulse tube intermediate heat exchanger 2.9, the secondary pulse tube low-temperature section heat regenerator 2.10 and the pulse tube refrigeration heat exchanger 2.11 are sequentially connected. The first pre-cooling heat exchangers include a primary first pre-cooling heat exchanger 1.5 and a secondary first pre-cooling heat exchanger 1.7. The primary first pre-cooling heat exchanger 1.5 is connected with the pulse tube intermediate heat exchanger 2.9, and the secondary first pre-cooling heat exchanger 1.7 is connected with the pulse tube refrigeration heat exchanger 2.11.

The minimum temperature range of the pulse tube intermediate heat exchanger 2.9 is about 60 K to 1000 K, so as to pre-cool the primary first pre-cooling heat exchanger 1.5 and the secondary pulse tube low-temperature section heat regenerator 2.10. After the secondary pulse tube low-temperature section heat regenerator 2.10 is pre-cooled, the minimum temperature range of the pulse tube refrigeration heat exchanger 2.11 is about 15 K to 20 K.

Referring to FIG. 1, as a possible example of the embodiment, the adsorption refrigeration unit is a two-stage adsorption refrigeration unit and includes a primary adsorption pump 3.1, a secondary adsorption pump 3.2, a primary evaporator 3.6, a secondary evaporator 3.8 and the adsorption refrigeration heat exchanger 3.9. The second pre-cooling heat exchangers include a primary second pre-cooling heat exchanger 3.5 and a secondary second pre-cooling heat exchanger 3.7. The primary adsorption pump 3.1 is connected with the primary evaporator 3.6 through a primary pipeline, and the refrigerant is circulated between the primary adsorption pump 3.1 and the primary evaporator 3.6. The secondary adsorption pump 3.2 is connected with the secondary evaporator 3.8 through a secondary pipeline, and the refrigerant is circulated between the secondary adsorption pump 3.2 and the secondary evaporator 3.8. The primary second pre-cooling heat exchanger 3.5 is in contact with each of the primary pipeline, the secondary pipeline and the throttling refrigeration heat exchanger 1.12 for heat exchange. The secondary second pre-cooling heat exchanger 3.7 is in contact with each of the primary evaporator 3.6 and the secondary pipeline for heat exchange. The adsorption refrigeration heat exchanger 3.9 is in contact with the secondary evaporator 3.8.

When in use, the throttling refrigeration heat exchanger 1.12 pre-cools the primary second pre-cooling heat exchanger 3.5, the primary second pre-cooling heat exchanger 3.5 pre-cools the refrigerant in the primary pipeline, and the primary evaporator 3.6 pre-cools the refrigerant in the secondary pipeline through the secondary second pre-cooling heat exchanger 3.7.

Referring to FIG. 1, as a possible example of the embodiment, the dilution refrigeration unit includes a suction pump 4.1, a mixing chamber 4.10, a distiller 4.5 and the dilution refrigeration heat exchanger 4.11. The input end of the suction pump 4.1 is connected with the first output end of the distiller 4.5 through a $^3$He (helium-3) circulating pipeline 4.2, the output end of the suction pump 4.1 is connected with the first input end of the mixing chamber 4.10 through a $^3$He circulating pipeline 4.2, and the output end of the mixing chamber 4.10 is connected with the input end of the distiller 4.5 through a $^3$He-$^4$He mixed fluid circulating capillary tube 4.6. A mixed fluid stop valve 4.8 is installed on the $^3$He-$^4$He mixed fluid circulating capillary tube 4.6. The second output end of the distiller 4.5 is connected with the second input end of the mixing chamber 4.10 through a $^4$He (helium-4) circulating pipeline 4.4. The dilution refrigeration heat exchanger 4.11 is connected with the mixing chamber 4.10. The third pre-cooling heat exchanger 4.7 is in contact with each of the $^3$He-$^4$He mixed fluid circulating capillary tube 4.6, the $^4$He circulating pipeline 4.4 and the $^3$He circulating pipeline 4.2. The adsorption refrigeration heat exchanger 3.9 is in contact with the third pre-cooling heat exchanger 4.7.

When the mixed solution of $^3$He and $^4$He is at 860 mK or above, the solution of $^3$He can be dissolved in the solution of $^4$He in any proportion. However, when the temperature of the mixed solution is decreased below 860 mK, the mixed solution is separated into two phases. The phase containing more $^3$He is referred to as the concentrated phase, and the phase containing less $^3$He is referred to as the diluted phase. The $^3$He in the mixing chamber 4.10 is in the concentrated phase. The adsorption refrigeration heat exchanger 3.9 cools a fluid in the $^3$He-$^4$He mixed fluid circulating capillary tube 4.6, so that the temperature of the distiller 4.5 is kept below 860 mK. Since the saturated vapor pressure of $^3$He is much higher than that of $^4$He, the $^3$He in the distiller 4.5 is pumped out by the suction pump 4.1, during which the $^3$He vaporizes and absorbs heat. In order to maintain the equilibrium of the two phases, $^3$He atoms in the mixing chamber 4.10 enter the distiller 4.5 through the $^3$He-$^4$He mixed fluid circulating capillary tube 4.6, and the pumped $^3$He is condensed and refilled into the concentrated phase of the mixing chamber 4.10, so as to form a circulation. The $^3$He releases heat during condensation, and the heat can be transferred to the adsorption refrigeration heat exchanger 3.9 to maintain the low temperature of the $^3$He. At the same time, the $^4$He in the distiller 4.5 is pumped into the mixing chamber 4.10 by a suction pump for $^4$He, and then $^4$He in the mixing chamber 4.10 enters the distiller 4.5 through the $^3$He-$^4$He mixed fluid circulating capillary tube 4.6 to complete the circulation of $^4$He in the system.

Referring to FIG. 1, in the embodiment, the dilution refrigeration unit further includes a first intermediate heat exchanger 4.3.1, a second intermediate heat exchanger 4.3.2 and a third intermediate heat exchanger 4.3.3. The $^3$He circulating pipeline 4.2 passes through the first intermediate heat exchanger 4.3.1, the second intermediate heat exchanger 4.3.2 and the third intermediate heat exchange 4.3.3. The first pre-cooling heat exchangers include a primary first pre-cooling heat exchanger 1.5 and a secondary first pre-cooling heat exchanger 1.7. The first intermediate heat exchanger 4.3.1 is in contact with the primary first pre-cooling heat exchanger 1.5. The second intermediate heat exchanger 4.3.2 is in contact with the secondary first pre-cooling heat exchanger 1.7. The third intermediate heat exchanger 4.3.3 is in contact with the throttling refrigeration heat exchanger 1.12. The primary first pre-cooling heat exchanger 1.5, the secondary first pre-cooling heat exchanger 1.7 and the throttling refrigeration heat exchanger 1.12 enable the first intermediate heat exchanger 4.3.1, the second intermediate heat exchanger 4.3.2 and the third intermediate heat exchanger 4.3.3 to get a low temperature respectively, and enable the $^3$He in the $^3$He circulating pipeline 4.2 to be cooled.

Referring to FIG. 1, as a possible example of the embodiment, the sub-Kelvin temperature zone refrigeration mechanism further includes a first cold screen 1.13, a second cold screen 1.14, a third cold screen 1.15 and a shell 1.16. The first pre-cooling heat exchangers include a primary first pre-cooling heat exchanger 1.5 and a secondary first pre-cooling heat exchanger 1.7. The first cold screen 1.13 and the throttling refrigeration heat exchanger 1.12 are enclosed into a first closed space. The second cold screen 1.14 and the secondary first pre-cooling heat exchanger 1.7 are enclosed into a second closed space. The third cold screen 1.15 and the primary first pre-cooling heat exchanger 1.5 are enclosed into a third closed space. The shell 1.16 is enclosed into a fourth closed space. The first closed space, the second closed space, the third closed space and the fourth closed space are sequentially nested from inside to outside. The dilution refrigeration heat exchanger 4.11 and the adsorption refrigeration heat exchanger 3.9 are located inside the first closed space. The pulse tube refrigeration heat exchanger 2.11 is located inside the third closed space and outside the second closed space. A supporting structure is arranged between the secondary first pre-cooling heat exchanger and the throttling refrigeration heat exchanger, and the two ends of the supporting structure are fixedly connected with the secondary first pre-cooling heat exchanger and the throttling refrigeration heat exchanger respectively.

The first cold screen, the second cold screen and the third cold screen are made of materials with good heat conduction performance, and an oxygen-free copper is preferably selected as the material with good heat conduction performance in the embodiment. For example, when the temperature of the first closed space is decreased, the temperature of the first cold screen 1.13 on the outer side of the first closed space can be quickly decreased along with the first closed space, so that the cooling capacity in the first closed space can be reduced. The insides of both the shell 1.16 and the third cold screen 1.15 are vacuumized for forming vacuum environment (the vacuum degree is kept above $10^{-4}$ Pa), so that gas flow and heat transfer therein are limited, and the influence of gas convection on the refrigeration effect can be reduced. In the embodiment, the shell 1.16 is preferably made of stainless steel, and the heat conduction performance of the shell 1.16 is weaker than that of the oxygen-free copper, so as to reduce the cooling amount in the fourth closed space to be dissipated to the outside through the shell 1.16.

In the embodiment, the sealing flange plate further includes a sealing flange plate 2.6. The sealing flange plate 2.6 is fixedly connected with each of the primary pulse tube heat regenerator 2.7, the secondary pulse tube high-temperature section heat regenerator 2.8 and the shell 1.16. The primary pulse tube hot end 2.4 and the secondary pulse tube hot end 2.5 are both located outside the fourth closed space. The primary pulse tube heat regenerator 2.7 and the secondary pulse tube high-temperature section heat regenerator 2.8 are located inside the fourth closed space and outside the third closed space.

Referring to FIG. 1, as a possible example of the embodiment, the throttling refrigeration heat exchanger 1.12 is connected with the secondary first pre-cooling heat exchanger 1.7 through a first heat switch 1.9. The primary adsorption pump 3.1 is connected with the throttling refrigeration heat exchanger 1.12 through a second heat switch 3.3. The secondary adsorption pump 3.2 is connected with the throttling refrigeration heat exchanger 1.12 through a third heat switch 3.4. The adsorption refrigeration heat exchanger 3.9 is connected with the mixing chamber 4.10 through a fourth heat switch 4.9. In the embodiment, the first heat switch 1.9, the second heat switch 3.3, the third heat switch 3.4 and the fourth heat switch 4.9 are all air gap type heat switches.

The heat switch has the characteristics that the thermal resistance is smaller when the heat switch is switched on, and the heat resistance is larger when the heat switch is switched off. When the temperature of the throttling refrigeration heat exchanger 1.12 is increased to a predetermined degree, the first heat switch 1.9 is switched on, so that the throttling refrigeration heat exchanger 1.12 is cooled by the secondary first pre-cooling heat exchanger 1.7. When the temperature of the throttling refrigeration heat exchanger 1.12 is decreased to a predetermined degree, the first heat switch 1.9 is switched off. In a similar way, when the temperature of the primary adsorption pump 3.1 is increased to a predetermined degree, the second heat switch 3.3 is switched on, so that the throttling refrigeration heat exchanger 1.12 cools the primary adsorption pump 3.1. When the temperature of the primary adsorption pump 3.1 is decreased to a predetermined degree, the second heat switch 3.3 is switched off. In a similar way, when the temperature of the secondary adsorption pump 3.2 is increased to a predetermined degree, the third heat switch 3.4 is switched on, so that the throttling refrigeration heat exchanger 1.12 cools the secondary adsorption pump 3.2. When the temperature of the adsorption pump 3.2 is decreased to a predetermined degree, the third heat switch 3.4 is switched off. When the temperature of the mixing chamber 4.10 is increased to a predetermined degree, the fourth heat switch 4.9 is switched on, so that the adsorption refrigeration heat exchanger 3.9 cools the mixing chamber 4.10. When the temperature of the mixing chamber 4.10 is decreased to a predetermined degree, the third heat switch 3.4 is switched off.

The adsorption capacity of adsorbent materials (such as activated carbon) in the primary adsorption pump 3.1 and the secondary adsorption pump 3.2 for the refrigerant (such as helium) is increased along with the decrease of a temperature of the adsorbent materials. When the second heat switch 3.3 is switched on, the temperature of the primary adsorption pump 3.1 is decreased, the adsorption capacity of the adsorbent material in the primary adsorption pump 3.1 for the refrigerant is enhanced. The condensed refrigerant in the primary evaporator 3.6 evaporates to absorb heat, so that the secondary second pre-cooling heat exchanger 3.7 is cooled, so as to cool the refrigerant in the secondary pipeline connected with the secondary second pre-cooling heat exchanger 3.7. Then, the temperature of the secondary evaporator 3.8 is decreased. When the third heat switch 3.4 is switched on, the temperature of the secondary adsorption pump 3.2 is decreased, the adsorption capacity of the adsorbent material in the secondary adsorption pump 3.2 for the refrigerant is enhanced, and the condensed refrigerant in the secondary evaporator 3.8 evaporates to absorb heat, so that the secondary evaporator 3.8 is cooled.

Specific examples are used for illustration of the principles and implementation methods of the present disclosure. The description of the above-mentioned embodiments is used to help illustrate the method and the core principles of the present disclosure, and meanwhile, those skilled in the art can make various modifications in terms of specific embodiments and scope of application in accordance with the principles of the present disclosure. In conclusion, the content of this specification shall not be construed as a limitation to the present disclosure.

What is claimed is:

1. A sub-Kelvin temperature zone refrigeration mechanism, comprising a pulse tube refrigeration unit, first pre-cooling heat exchangers, a throttling refrigeration unit, second pre-cooling heat exchangers, an adsorption refrigeration unit, a third pre-cooling heat exchanger and a dilution refrigeration unit, wherein the pulse tube refrigeration unit comprises a pulse tube refrigeration heat exchanger, and the pulse tube refrigeration heat exchanger is connected with the throttling refrigeration unit through the first pre-cooling heat exchangers so as to pre-cool the throttling refrigeration unit;

the throttling refrigeration unit comprises a throttling refrigeration heat exchanger, and the throttling refrigeration heat exchanger is connected with the adsorption refrigeration unit through the second pre-cooling heat exchangers so as to pre-cool the adsorption refrigeration unit;

the adsorption refrigeration unit comprises an adsorption refrigeration heat exchanger, and the adsorption refrigeration heat exchanger is connected with the dilution refrigeration unit through the third pre-cooling heat exchanger so as to pre-cool the dilution refrigeration unit; and the dilution refrigeration unit comprises a dilution refrigeration heat exchanger, and the dilution refrigeration heat exchanger is a refrigeration terminal of the sub-Kelvin temperature zone refrigeration mechanism:

wherein the throttling refrigeration unit comprises a throttling compressor, a throttling valve and the throttling refrigeration heat exchanger, an output end of the throttling compressor is connected with an input end of the throttling valve, an output end of the throttling valve is connected with an input end of the throttling refrigeration heat exchanger, and an output end of the throttling refrigeration heat exchanger is connected with an input end of the throttling compressor; and the first pre-cooling heat exchangers are located between the throttling compressor and the throttling valve and configured for cooling gas output by the throttling compressor.

2. The sub-Kelvin temperature zone refrigeration mechanism according to claim 1, wherein the throttling refrigeration unit further comprises counter-flow heat exchangers, and the counter-flow heat exchangers are located between the throttling compressor and the throttling valve and configured for cooling gas output by the throttling compressor.

3. The sub-Kelvin temperature zone refrigeration mechanism according to claim 1, wherein the pulse tube refrigeration unit is a two-stage pulse tube refrigeration unit and comprises a primary pulse tube phase modulation component, a pulse tube main drive compressor, a secondary pulse tube phase modulation component, a primary pulse tube hot end, a secondary pulse tube hot end, a primary pulse tube heat regenerator, a secondary pulse tube high-temperature section heat regenerator, a pulse tube intermediate heat exchanger, a secondary pulse tube low-temperature section heat regenerator and the pulse tube refrigeration heat exchanger;

an output end of the pulse tube main drive compressor is connected with each of the primary pulse tube hot end and the secondary pulse tube hot end;

the primary pulse tube phase modulation component, the primary pulse tube hot end, the primary pulse tube heat regenerator and the pulse tube intermediate heat exchanger are sequentially connected;

the secondary pulse tube phase modulation component, the secondary pulse tube hot end, the secondary pulse tube high-temperature section heat regenerator, the pulse tube intermediate heat exchanger, the secondary pulse tube low-temperature section heat regenerator and the pulse tube refrigeration heat exchanger are sequentially connected;

the first pre-cooling heat exchangers comprise a primary first pre-cooling heat exchanger and a secondary first pre-cooling heat exchanger, the primary first pre-cooling heat exchanger is connected with the pulse tube intermediate heat exchanger, and the secondary first pre-cooling heat exchanger is connected with the pulse tube refrigeration heat exchanger.

4. The sub-Kelvin temperature zone refrigeration mechanism according to claim 1, wherein the adsorption refrigeration unit is a two-stage adsorption refrigeration unit and comprises a primary adsorption pump, a secondary adsorption pump, a primary evaporator, a secondary evaporator and the adsorption refrigeration heat exchanger; the second pre-cooling heat exchangers comprise a primary second pre-cooling heat exchanger and a secondary second pre-cooling heat exchanger;

the primary adsorption pump is connected with the primary evaporator through a primary pipeline;

the secondary adsorption pump is connected with the secondary evaporator through a secondary pipeline;

the primary second pre-cooling heat exchanger is in contact with each of the primary pipeline, the secondary pipeline and the throttling refrigeration heat exchanger for heat exchange, the secondary second pre-cooling heat exchanger is in contact with each of the primary evaporator and the secondary pipeline for heat exchange, and the adsorption refrigeration heat exchanger is in contact with the secondary evaporator.

5. The sub-Kelvin temperature zone refrigeration mechanism according to claim 1, wherein the dilution refrigeration unit comprises a suction pump, a mixing chamber, a distiller and the dilution refrigeration heat exchanger;

an input end of the suction pump is connected with a first output end of the distiller through a $^3$He circulating pipeline, an output end of the suction pump is connected with a first input end of the mixing chamber through the $^3$He circulating pipeline, and an output end of the mixing chamber is connected with an input end of the distiller through a $^3$He-$^4$He mixed fluid circulating capillary tube;

a second output end of the distiller is connected with a second input end of the mixing chamber through a $^4$He circulating pipeline;

the dilution refrigeration heat exchanger is connected with the mixing chamber;

the third pre-cooling heat exchanger is in contact with each of the $^3$He-$^4$He mixed fluid circulating capillary tube, the $^4$He circulating pipeline and the $^3$He circulating pipeline, and the adsorption refrigeration heat exchanger is in contact with the third pre-cooling heat exchanger.

6. The sub-Kelvin temperature zone refrigeration mechanism according to claim 5, wherein the dilution refrigeration unit further comprises a first intermediate heat exchanger, a second intermediate heat exchanger and a third intermediate heat exchanger, and the $^3$He circulating pipeline passes through the first intermediate heat exchanger, the second intermediate heat exchanger and the third intermediate heat exchanger;

the first pre-cooling heat exchangers comprise a primary first pre-cooling heat exchanger and a secondary first pre-cooling heat exchanger;

the first intermediate heat exchanger is in contact with the primary first pre-cooling heat exchanger;

the second intermediate heat exchanger is in contact with the secondary first pre-cooling heat exchanger; and the third intermediate heat exchanger is in contact with the throttling refrigeration heat exchanger.

7. The sub-Kelvin temperature zone refrigeration mechanism according to claim 1, further comprising a first cold screen, a second cold screen, a third cold screen and a shell, wherein the first pre-cooling heat exchangers comprise a primary first pre-cooling heat exchanger and a secondary first pre-cooling heat exchanger;

the first cold screen and the throttling refrigeration heat exchanger are enclosed into a first closed space, the second cold screen and the secondary first pre-cooling heat exchanger are enclosed into a second closed space, the third cold screen and the primary first pre-cooling heat exchanger are enclosed into a third closed space, and the shell is enclosed into a fourth closed space;

the first closed space, the second closed space, the third closed space and the fourth closed space are sequentially nested from inside to outside;

the dilution refrigeration heat exchanger and the adsorption refrigeration heat exchanger are located inside the first closed space; and the pulse tube refrigeration heat exchanger is located inside the third closed space and located outside the second closed space.

8. The sub-Kelvin temperature zone refrigeration mechanism according to claim 1, wherein the throttling refrigeration heat exchanger is connected with one of the first pre-cooling heat exchangers through a first heat switch.

\* \* \* \* \*